United States Patent [19]

Fannin et al.

[11] 4,149,742
[45] Apr. 17, 1979

[54] ENERGY ABSORBER FOR VEHICLES

[75] Inventors: Wayne V. Fannin, Xenia; Loren R. Gute, Dayton, both of Ohio

[73] Assignee: General Motors Corporation, Detroit, Mich.

[21] Appl. No.: 856,527

[22] Filed: Dec. 1, 1977

[51] Int. Cl.² .............................................. B60R 19/06
[52] U.S. Cl. .................................... 293/121; 267/139; 293/136
[58] Field of Search ................... 293/60, 70, 71 R, 72, 293/73, 85, 87, 88, 89, 91, 92, 93, 94, 99; 267/139, 140

[56] References Cited

U.S. PATENT DOCUMENTS

| 2,903,289 | 9/1959 | Klix | 293/72 |
|---|---|---|---|
| 4,046,411 | 9/1977 | Richard | 293/73 |
| 4,063,713 | 12/1977 | Anolick et al. | 293/88 |
| 4,076,226 | 2/1978 | Anolick et al. | 267/139 |

Primary Examiner—Charles E. Frankfort
Attorney, Agent, or Firm—Charles R. White

[57] ABSTRACT

This energy absorber incorporates a mounting bracket secured to a vehicle which by track and follower mechanism slidably mounts a support bracket that is secured to a vehicle bumper. One bracket supports a laterally extending energy absorbing band of resilient material engaged by the follower carried by the other bracket. On impact, the brackets are telescoped inwardly and an intermediate portion of the band is displaced by the follower to effect band deflection and energy absorption. On rebound, the band gradually restores to its original configuration to return the brackets and bumper to its pre-impact position.

5 Claims, 7 Drawing Figures

ENERGY ABSORBER FOR VEHICLES

This invention relates to energy absorbers and more particularly to an energy absorbing unit featuring new and improved energy absorbing resilient band and mounting bracket construction yieldably coupling relatively movable vehicle components.

Prior to the present invention, a wide variety of energy absorber units have been utilized to mount a rigid, transversely extending bumper beam to the frame or unibody construction of a vehicle for absorbing impact energy. Some of these units comprise telescoping inner and outer cylinders or similar components which are movable from an extended position to a telescoped and collapsed position on bumper impact of predetermined magnitudes. These energy absorber units often employ viscous fluids, spring devices or stretchable bands for dissipating the energy of such impacts. While these energy absorber devices have adequately performed to absorb impact energy, they are often complex in construction and have added considerable weight to the vehicle.

The present invention is drawn to a new and improved light-weight energy absorbing unit having a minimal number of parts which comprises a pair of brackets that are telescopically movable relative to each other on impact of the bumper of a vehicle. The brackets are slidably interconnected by a pair of pins or other follower mechanisms guided by track means. One of the brackets carries an endless band or belt of oriented plastic material which can be tailored to suit the various energy absorbing requirements by increasing or decreasing the thickness of the band or, in the case of a multi-wrapped band, by varying the number of wraps of the material forming the band. The band is supported in a laterally extending manner at either end by fixed pin means or by special pin means which can be cammed outwardly on impact of the bumper to deflect the band to effect absorption of impact energy. Follower means guided by a track formed in one of the brackets will flex the band in response to impact loads above a minimum load applied to the bumper. With the followr stretching the laterally-extending band from its midportion, there is increased band flexure in a foreshortened energy absorbing unit.

It is a feature, object and advantage of this invention to provide a new and improved energy absorbing unit, which is particularly adaptable for vehicle bumpers, vehicle suspensions or the like, that incorporates a minimal number of components which is light-weight and highly effective in absorbing input energy on the displacement of a resilient laterally-extending energy absorbing band. After removal of the impact load, the band will slowly return to its original position so that the bumper or other component will be returned to its original position without excessive rebound velocity.

It is another feature, object and advantage of this invention to provide an energy absorbing unit incorporating a pair of relatively movable telescopic brackets connecting a bumper to a vehicle which incorporates a slidable follower guided by a longitudinally extending track. On bumper impact, the follower stretches a laterally extending resilient band in response to an impact load applied to the bumper to dissipate impact energy. The force of the recovery of the band returns the bumper assembly and the brackets to their pre-impact position. The band is preloaded and yieldably holds the bumper outwardly of the vehicle body.

It is another feature, object and advantage of this invention to provide a new and improved energy absorbing unit comprising a laterally extending band of resilient material which is supported at its ends and which is stretched by a follower mechanism to an extended position to effectively absorb input energy.

These and other features, objects and advantages of this invention will be more apparent from the following detailed description and drawings in which.

Figure 1:
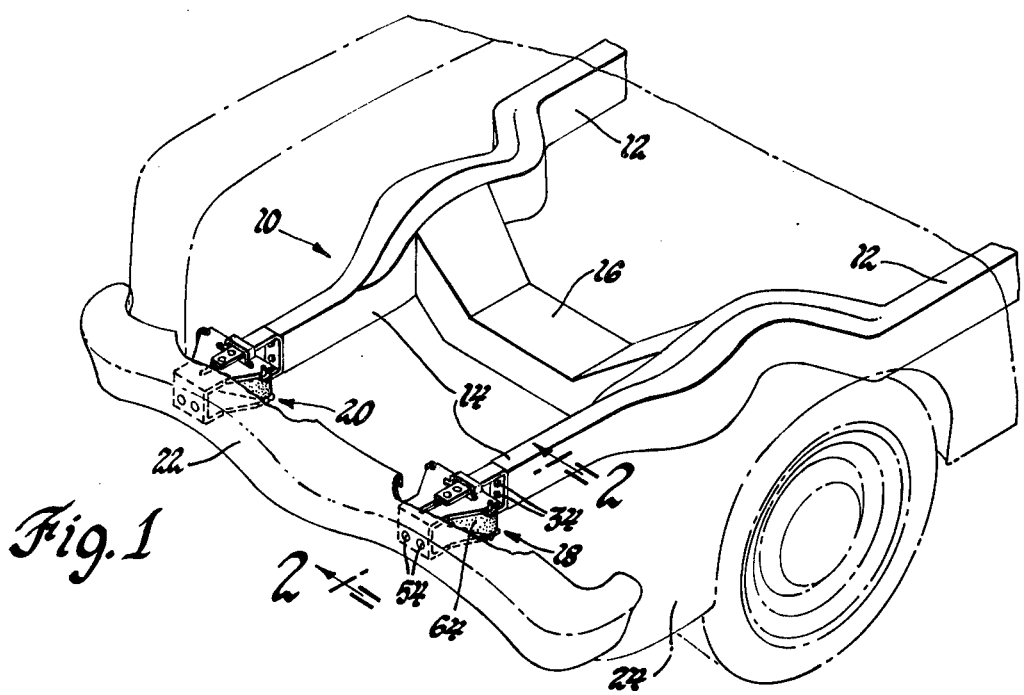
FIG. 1 is a perspective view of an automotive vehicle chassis frame and a pair of energy absorber units mounting a bumper assembly to the frame.

Referring now to FIG. 1 of the drawings, there is shown a portion of a vehicle chassis frame 10 comprising a pair of laterally spaced side rails 12 having forwardly extending front portions 14 interconnected by a cross member 16. Secured by bolts or other suitable fasteners to the end of the front portions 14 of the frame are a pair of energy absorbing units 18 and 20 that support a bumper assembly 22 outwardly of the body work 24 of the vehicle. Since both of the units are the same in construction, only one is described in detail.

As shown, the energy absorbing unit18 has a U-shaped frame bracket 25 opening outwardly from the body work with upper and lower legs 26 and 28 interconnected by a base 30. The base 30 has openings 32 extending therethrough for reception of threaded fastener means 34 that secure the bracket 25 to the end of the front portion of the frame. The upper and lower legs 26 and 28 of the bracket 25 extend longitudinally from the end of the side rails. Mounted in the outer end portion of the legs of bracket 25 are a pair of vertical slide pins 36 and 38 longitudinally aligned with each other which are slidably guided in longitudinally extending slots or tracks 42 and 44 formed respectively in the upper and lower sides 46 and 48 of a bumper bracket 50. The bumper bracket is telescopically mounted on the frame bracket. The two sides of the bumper bracket are vertically spaced from each other by an intermediate portion 52 which is adapted to be secured to the bumper assembly 22 by threaded fasteners 54. The upper and lower sides of bumper bracket 50 are the same, each having laterally extending wings notched at 56 and 58 on the outer extremities thereof to receive the static mounting pins 60 and 62 around which a multi-layered energy absorbing band or belt 64 is looped. The band 64 is preferably a resilient energy absorbing unit of thin oriented plastic material such as that more fully described in U.S. Pat. No. 4,046,411 for "Energy Absorber and Method of Manufacture" which is hereby incorporated by reference.

Figure 2:
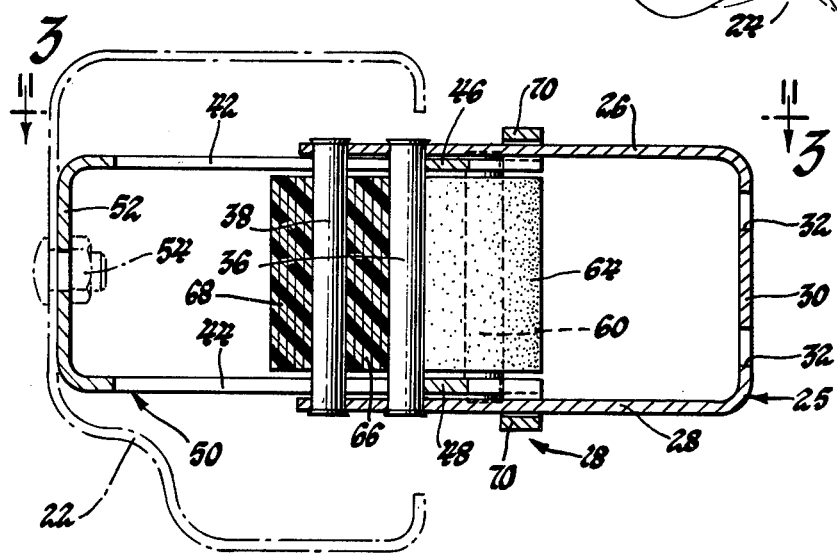
FIG. 2 is an enlarged sectional view taken along the plane indicated by line 2—2 of FIG. 1 showing an energy absorber unit of this invention in its normal extended position.
Figure 3:
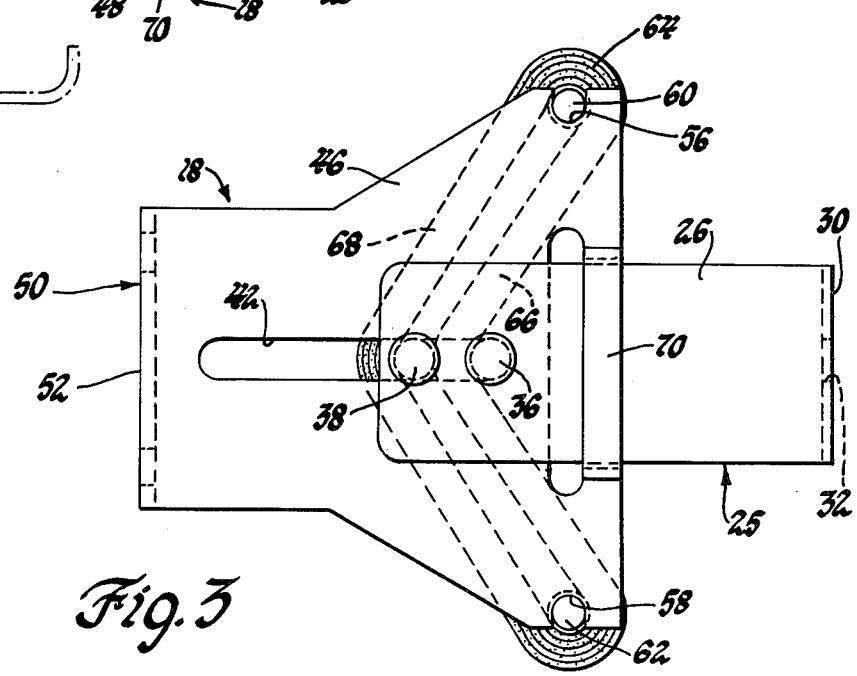
FIG. 3 is a view taken along the plane indicated by line 3—3 of FIG. 2.

As best shown in FIGS. 2 and 3, the energy absorbing band 64 is preloaded and ready for immediate stretching and energy absorption on application of predetermined impact loads applied to bumper 22. The inner length 66 of band 64, extending between pins 60 and 62, is stretched over the rear slide pin 36. In a similar manner, the outer length 68 of belt 64 is stretched over the outer slide pin 38. With the energy absorbing belt initially stretched and preloaded as best illustrated in FIG. 3, the bumper assembly is yieldably held outward of the body work and is ready for inward stroking movement and effective energy absorption in response to a predetermined impact load directed to the bumper assembly.

In addition to the longitudinal guidance by pin 36 and 38 riding in the slots 42 in response to telescoping movement of the two brackets on the stroking of the bumper, the sides of the bumper bracket 50 are each provided with a strap, such as strap 70, which fits over the guides the legs 26 and 28 of the frame bracket 25 on the telescoping movement of the brackets relative to each other. Thus, on application of an impact load to the bumper, the bumper will be moved inwardly relative to the frame member and the body work. The pins 36 and 38 will be guided in the track 42 to stretch both lengths 66 and 68 of the looped energy absorber band by equal amounts to effect the absorption of impact energy and thus protect the vehicle body work from damage. On removal of the impact loads, the energy absorbing band will gradually return to its original preloaded position shown in FIG. 3. This action gradually moves the pins 36 and 38 from a forward position in slot 42 to the position shown in full lines in FIG. 3 and the bumper is returned to its original position at low velocity.

Figure 4:
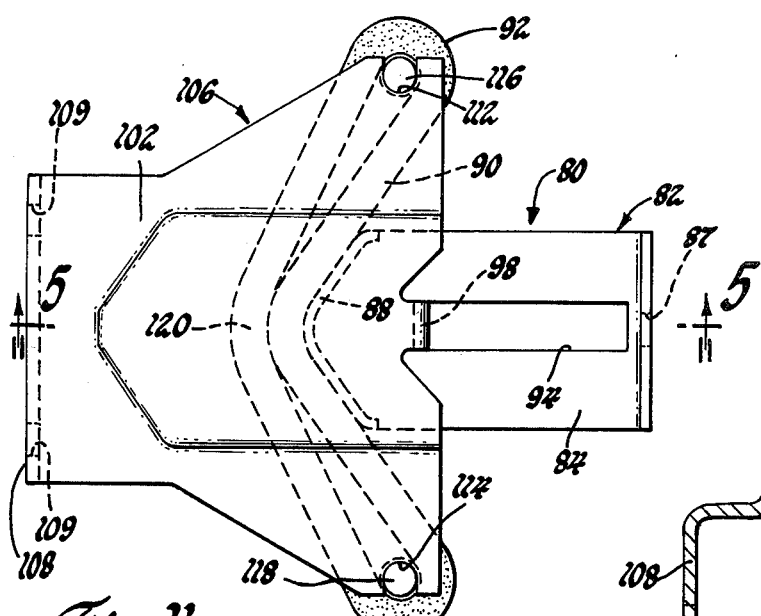
FIG. 4 is a view similar to the view of FIG. 3 but illustrating a modification of the invention.
Figure 5:
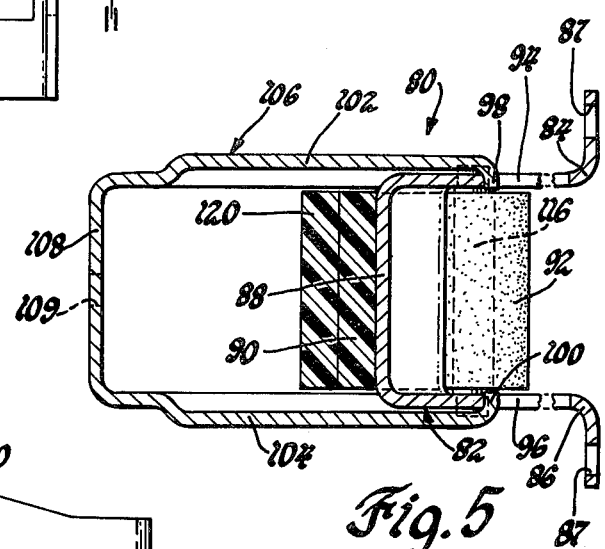
FIG. 5 is a view taken generally along the plane indicated by line 5—5 of FIG. 4.

FIG. 4 illustrates another energy absorbing unit 80 forming a second embodiment of the invention. In construction, this embodiment comprises a U-shaped frame bracket 82 having upper and lowr legs 84 and 86 vertically bent at their ends adapted to be secured to the front of the vehicle side rails 12 by threaded fasteners extending through openings 87. The frame bracket is formed with a V-shaped nose portion 88 interconnecting the legs which is adapted to contact a central portion of inner length 90 of an energy absorber band 92 which can be made from a single thickness of oriented plastic material instead of the multi-wrap material of the band of the first embodiment. The upper and lowr legs 82 and 86 are formed with elongated slots or tracks 94 and 96 into which inwardly extending tangs 98 and 100 of upper and lower sides 102 and 104 of bumper bracket 106 extend. These tangs form followers which ride in the tracks 94 and 96 as the bracket telescopes on bumper impact to guide the relative movement of the bracket member on impact of the bumper. The bumper is secured to an outer base portion 108 interconnecting sides 102 and 104 of the bumper bracket by suitable fasteners, not shown, extending through openings 109. The sides of the brackets are wing-shaped and have tips which are notched at 112 and 114 to receive the static pins 116 and 118 around which the band 92 is wrapped. As shown, the band 92 has an outer length 120 stretching between the pins. The length 120 has a midportion which is in contact with the projecting midportion of length 90 as illustrated in FIGS. 4 and 5. As will be appreciated, the inner length 90 has a larger preload than the outer length 120 in view of the differences in preload stretching. On impact, the nose portion of the bracket will stretch the band as the two brackets telescope relative to one another to absorb impact energy. On removal of impact loads, the band gradually returns to its preload position to reposition the bumper assembly in its outer protective position outwardly of the vehicle body. As in the previous embodiments, the return of the bumper to this position is controlled by the rate of recovery of the band and materials are selected so that the return rate is sufficiently low for slow bumper recovery.

Figure 6:
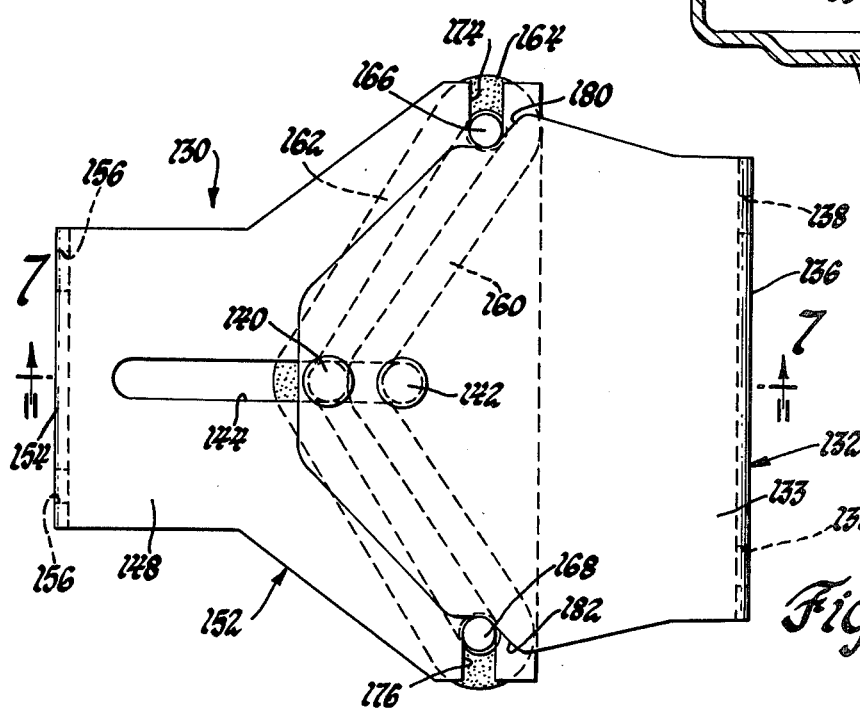
FIG. 6 is another view similar to the view of FIG. 3 showing a second modification of the invention.
Figure 7:
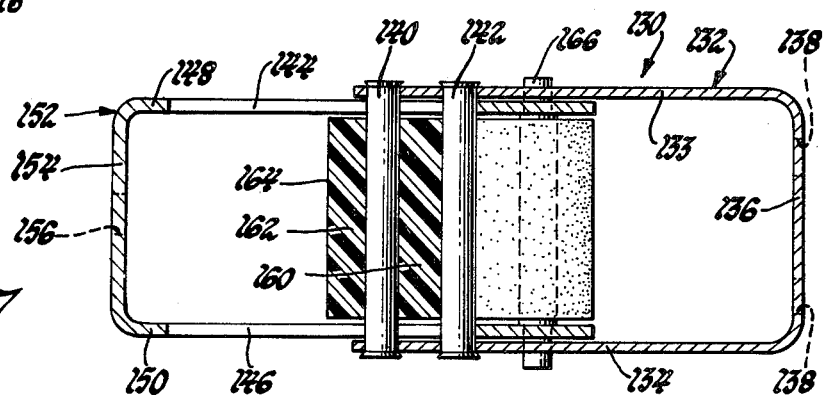
FIG. 7 is a view taken generally along the plane indicated by line 7—7 of FIG. 6.

The modification of the invention shown in FIGS. 6 and 7 is somewhat similar in construction and operation to the previously described modification. FIGS. 6 and 7 illustrate an energy absorber unit 130 having a frame bracket 132, U-shaped in cross section, which opens outwardly with upper and lower sides 133 and 134. These sides are connected by a base 136 that is formed with suitable openings 138 for reception of threaded fasteners which attach the frame bracket to the side rails. The outer end of the frame bracket 132 carries a pair of vertical slide pins 140 and 142 which are guided in longitudinally extending slots or tracks 144 and 146 formed in the upper and lower sides 148 and 150 of a U-shaped bumper bracket 152. The sides of the bumper bracket are interconnected at their outer ends by a base 154 which is formed with openings 156 for threaded fasteners which secure a bumper assembly, not shown, to the bumper bracket. As in the embodiments of FIGS. 1–3, pins 140 and 142 engage the inner and outer lengths 160 and 162 of an energy absorbing band 164 which is like that of the embodiment of FIGS. 4 and 5. The band 164 extends around laterally movable pins 166 and 168 which are vertically mounted in laterally spaced notches 174 and 176 formed in the sides of the bumper bracket. In the pre-stressed position, the pins 166 and 168 are held in the laterally spaced notches 174 and 176. However, on impact greater than a predetermined minimal impact load on the bumper, camming ramps 180 and 182 force the pins 166 and 168, anchoring the ends of the band, outwardly to increase the stretch of the energy absorbing band.

Thus, on impact of the bumper assembly, the pins 140 and 142 are activated to effect a stretching of the energy absorbing band from its midportion, as the pins 166 and 168 stretch the band laterally to effect increased stretching and energy absorption.

Accordingly, it will be appreciated that this displacement of the band from its outer ends as well as the movement of the midportion of the band on impact will absorb a greater amount of impact energy as compared to the FIG. 1 embodiment for the same stroke.

While this invention has been described in connection with vehicle bumpers, it could be readily employed for suspensions and other similar uses. It will be appreciated that various modifications and embodiments of the construction can be made in view of this description and without departing from the disclosure or the scope of the following claims.

We claim:

1. An energy absorbing unit for operatively mounting a bumper beam to a vehicle comprising a support bracket secured to the vehicle, a bumper beam bracket secured to the bumper beam and extending inwardly therefrom into telescopic relationship with respect to said support bracket, longitudinally extending track means on one of said brackets, follower means carried by the other of said brackets operatively mounted and guided by said track means for movement between first and second longitudinal telescopic positions, an energy absorber of resilient material looped into an endless band with outer ends operatively connected by inner and outer lengths, said band having its major dimension formed by said lengths extending laterally of said brackets, laterally-spaced fastener means connecting said outer ends of said energy absorbing band to one of said brackets and preloading said band, band displacement means for said inner and outer lengths carried by one of said brackets, said inner and outer lengths of said band having midportions disposed outwardly of said band displacement means associated therewith whereby said band is operatively engaged and said inner and outer lengths are stretched by said band displacement means as said follower means moves with respect to said track means in response to impact of said bumper resulting in the relative telescopic movement of said brackets from said first toward said second position to thereby dissipate impact energy.

2. An energy absorbing unit for operatively mounting a bumper beam to a vehicle and outwardly of the body work thereof comprising a support bracket secured to the vehicle, a bumper beam bracket secured to the bumper beam of a vehicle and extending inwardly therefrom into telescopic relationship with respect to said support bracket, longitudinally extending track means on one of said brackets, follower means carried by the other of said brackets operatively mounted and guided by said track means for movement between first and second longitudinal telescopic positions, band means of resilient material extending laterally of said brackets, laterally spaced retainer means for said band means secured to one of said brackets, said band means being looped about said retainer means to form a continuous member with separate inner and outer lengths initially stretched against said follower means to preload said band means and yieldably hold said bumper outwardly of said body work, said lengths of said band means having a midportion disposed outwardly of said follower means whereby each of said lengths of said band means is further stretched by said follower means as said follower means is displaced along said track means in response to impact of said bumper resulting in the movement thereof and the relative telescopic movement of said brackets from said first toward said second position to thereby dissipate impact energy.

3. An energy absorbing unit for operatively mounting a bumper beam to a vehicle outwardly of the body work thereof comprising a support bracket secured to the vehicle, a bumper beam bracket secured to the bumper beam and extending inwardly therefrom, longitudinally extending track means on one of said brackets, follower means carried by the other of said brackets operatively mounted and guided by said track means for movement between first and second longitudinal positions, contact means carried by one of said brackets, endless energy absorbing band means extending laterally of said brackets, having separate inner and outer lengths, each of said lengths having a central portion engaged by said contact means, said band means having looped outer ends operatively connecting said inner and outer lengths, first and second anchor means laterally spaced from one another connecting said looped outer ends of said energy absorbing band means to one of said brackets to preload said band means and thereby yieldably hold said bumper beam outwardly of the body work of the vehicle, said central portion of said lengths being displaced outwardly as said contact means is displaced along said track means in response to impact loads applied to said bumper means to deform said inner and outer lengths of said band means for impact energy absorption as said band is deflected from the midportion thereof.

4. An energy absorbing unit for operatively mounting a bumper beam to a vehicle outwardly of the body work thereof comprising a support bracket secured to the vehicle, a bumper beam bracket secured to the bumper beam of a vehicle and extending inwardly therefrom, longitudinally extending track means on one of said brackets, follower means carried by the other of said brackets operatively mounted and guided by said track means for movement between first and second longitudinal positions, endless energy absorbing band means extending laterally of said brackets, said band means describing a loop having separate inner and outer lengths, each of said lengths having a central portion directly contacted by said follower means, said band means having outer ends interconnecting said inner and outer lengths, fastener means connecting said outer ends of said energy absorbing band means to one of said brackets to preload said band means against the other of said brackets to thereby yieldably hold said bumper beam outwardly of the body work of the vehicle, said central portion being diplaced outwardly by said follower means as said follower means is displaced along said track means in response to impact loads moving said bumper beam toward said body work to deform said band means for impact energy absorption as said midportion of said band is deflected.

5. An energy absorbing unit for operatively mounting a bumper beam to vehicle comprising a support bracket secured to the vehicle, a bumper beam bracket secured to the bumper beam of a vehicle and extending inwardly therefrom, longitudinally extending track means on one of said brackets, follower means carried by the other of said brackets operatively mounted and guided by said track means for movement between first and second longitudinal positions along said track means, energy absorbing band means of resilient material looped into an endless belt extending laterally of said brackets and having a midportion contacted by said follower means, fastener means laterally spaced from one another connecting the outer loops of said energy absorber to one of said brackets, and cam means carried by the other of said brackets for moving said fastener means laterally outwardly in response to impact loads applied to said bumper beams and stretching said band means for impact energy absorption as said midportion of said band is deflected by said follower means.

* * * * *

UNITED STATES PATENT AND TRADEMARK OFFICE
CERTIFICATE OF CORRECTION

PATENT NO. : 4,149,742
DATED : April 17, 1979
INVENTOR(S) : Wayne V. Fannin et al It is certified that error appears in the above-identified patent and that said Letters Patent are hereby corrected as shown below:

Title page, column 1, line 42, "followr" should read -- follower --.

Column 3, line 15, after "over", "the" should read -- and --.

Column 3, line 24, after "vehicle" insert -- and --.

Column 3, line 34, "lowr" should read -- lower --.

Column 3, line 43, "lowr" should read -- lower --.

Column 3, line 62, "differences" should read -- difference --.

Column 5, line 10, after "bumper" insert -- beam --.

Column 6, line 31, "diplaced" should read -- displaced --.

Column 6, line 38, after "to" insert -- a --.

Signed and Sealed this

Twenty-fifth Day of December 1979

[SEAL]

Attest:

SIDNEY A. DIAMOND

Attesting Officer

Commissioner of Patents and Trademarks